United States Patent [19]

Levi

[11] Patent Number: 5,678,200

[45] Date of Patent: Oct. 14, 1997

[54] INDEPENDENT WIDEBAND RF TRANSMISSION DETECTOR FOR CELLULAR TELEPHONE

[75] Inventor: Yosef Levi, Holon, Israel

[73] Assignee: Mercur Ltd., Holon, Israel

[21] Appl. No.: 493,061

[22] Filed: Jun. 21, 1995

[51] Int. Cl.[6] .................................................. H04B 1/16
[52] U.S. Cl. ..................... 455/88; 455/345; 379/441
[58] Field of Search ........................... 455/67.1, 88, 99, 455/221, 222, 345, 194.1, 227, 352, 355, 200.1; 381/86; 379/61, 441

[56] References Cited

U.S. PATENT DOCUMENTS

| | | |
|---|---|---|
| 1,909,843 | 5/1933 | Squire . |
| 3,868,571 | 2/1975 | Greiner . |
| 3,971,985 | 7/1976 | Arai . |
| 4,027,249 | 5/1977 | Calman . |
| 4,105,974 | 8/1978 | Rogers . |
| 4,389,543 | 6/1983 | Granirer et al. . |
| 4,524,461 | 6/1985 | Kostanty et al. ............... 455/88 |
| 4,591,661 | 5/1986 | Benedetto et al. . |
| 4,673,832 | 6/1987 | Murakami et al. ............ 455/222 |
| 4,775,997 | 10/1988 | West, Jr. et al. . |
| 4,873,712 | 10/1989 | Porco . |
| 4,922,549 | 5/1990 | Johnson et al. ............... 455/221 |
| 4,993,061 | 2/1991 | Hsieh . |
| 5,233,646 | 8/1993 | Kuromi . |
| 5,241,582 | 8/1993 | Park ............................... 455/88 |
| 5,243,640 | 9/1993 | Hadley et al. . |
| 5,247,705 | 9/1993 | Attig et al. ..................... 455/345 |
| 5,333,153 | 7/1994 | Brown et al. .................. 455/222 |
| 5,404,391 | 4/1995 | Wavroch et al. ............... 379/59 |

FOREIGN PATENT DOCUMENTS 59-36438 (A) of 1984 Japan .

OTHER PUBLICATIONS

"Devise Adds Profits to Cellular Installs", Installation News (Apr. 1988) pp. 40,41.

Primary Examiner—Edward F. Urban
Attorney, Agent, or Firm—Mark M. Friedman

[57] ABSTRACT

A device for controlling an accessory based on the detection of transmissions of appropriate input frequency exceeding a minimum threshold amplitude from a nearby cellular telephone. The device includes an independent receiver for directly detecting the transmissions from the nearby cellular telephone and a controller connected to the receiver for controlling the accessory device based on the detection of the transmission from the nearby cellular phone. The independent receiver includes a frequency discriminator of a totally digital design for detecting a signal which is greater than a predetermined threshold frequency and amplitude.

20 Claims, 5 Drawing Sheets

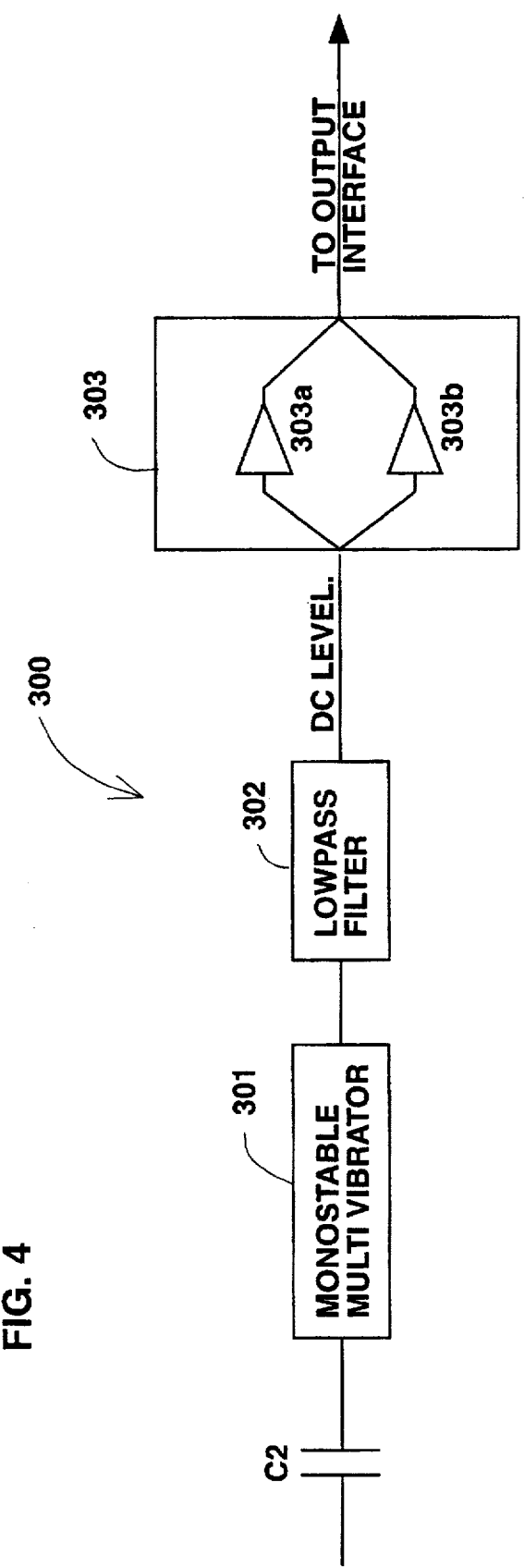

# 5,678,200

INDEPENDENT WIDEBAND RF TRANSMISSION DETECTOR FOR CELLULAR TELEPHONE

FIELD AND BACKGROUND OF THE INVENTION

The present invention relates to a device which detects activity of a cellular telephone in its close proximity, without direct connection to the cellular telephone, and which controls one or more accessory devices, in response to the activity of the cellular telephone, and, more particularly, relates to an inexpensive wideband radio receiver which incorporates means for determining that a cellular telephone conversation is in progress, in a cellular phone nearby, and which, in response to this determination, operates an output control device to appropriately control operation of an accessory device to which it is usually directly connected for cost reasons, although non-galvanic connection means may also be used, such as an auxiliary radio link, or an optocoupler, for example, in cases where electrical isolation is required, as for safety reasons.

Prior-art devices require direct connection to the cellular telephone, typically to its input power supply line, to monitor the supply current, to indirectly determine activity of the cellular telephone. This is disadvantageous, since it does not allow the detection of a conversation in a portable, handheld cellular phone, which contains its own battery power supply, and which will not remain in the vicinity of the activity-detecting device for a substantial time, before being carried by the user with him to another location. Further, in prior-art, the control input to the accessory device is usually its supply line, which is disadvantageous in the usual case of disabling an audio source in close proximity to the cellular telephone, since this may often result in "popping" of the audio output when the power is restored to the audio device, due to dc bias conditions in the audio device at the time of the restoration of its power.

The usual application which inventors, in particular, are addressing, is the case of a cellular telephone, installed in a car, with radio or other audio accessory. During a telephone conversation, it is clearly desirable to remove competing sound sources, as has been addressed in the prior art. Earlier related work includes removing power to the audio portions of an accessory unit, or removing power totally, or switching the speaker connections. Earlier related work uniformly requires direct electrical connection to the audio accessory.

In an automotive environment, every connection is costly to the original-equipment manufacturer, and, in the aftermarket, to the individual owner. Hence, it is desirable to reduce requirements for connections, and especially, as the inventors have anticipated, to the cellular phone, since, this permits now use of a battery-operated cellular phone in the car, with the same convenience as a hard-wired unit. Thus, the device of the invention is an independent device, i.e., a device not directly connected to the cellular phone. Further, the connection to the cellular phone power source was used to monitor supply drain as an indicator of activity; this is unit-dependant, and implies a possible compatibility problem of the threshold detection.

A further advantage of this invention is the ability to quiet audio accessories due to compensation from more than one cellular telephone unit. For example, if the driver and one or more passengers have cellular phone, any of the three may be in use individually or simultaneously.

Such audio accessory to be quieted during the cellular telephone conversation may be an audio system, including an audio amplifier or a compact disc player or a tape player or a radio or a cb radio or a phonograph or a stereo system or the like, or any combination of these.

In more detail, the following prior art references may be pertinent to the present invention:

U.S. Pat. No. 1,909,843, Squires, and U.S. Pat. No. 4,389,543, Grainier and Jason, and U.S. Pat. No. 5,233,646, Kuromi, and U.S. Pat. No. 4,993,061, Hsiehm and U.S. Pat. No. 4,591,661, Bendetto and Shepherd, all make direct electrical connection to the normal, wired, telephone line pair to detect off-hook and possibly ringing conditions.

Concerning cellular phones, U.S. Pat. No. 5,241,582, Park, and U.S. Pat. No. 4,873,712, Porco, and article Ser. No. 196,954, ORA Devices, use direct wired electrical connection to the cellular telephone power supply to sense increased supply drain of the cellular phone during times of activity (ringing and off-hook), providing an indirect measurement of activity. Park and Porco switch off power to the audio system in the car; ORA switches off power to the car radio.

Further, sensing of audio energy is used by other, e.g., U.S. Pat. No. 4,524,461, Kostanty, Sciabarrasi, and Grossman, and U.S. Pat. No. 4,027,249, Calman.

Rogers, U.S. Pat. No. 4,105,974, combines a received-audio detector from a CB receiver with sensing of transmitted rf from a CB transmitter to switch a shared speaker between a CB transmitter/receiver and a broadcast receiver. This is not uniquely related to telephony, but uses an rf detector for transmission sensing.

The present invention relates to cellular telephone activity sensing, uses no direct electrical connection to the cellular phone, whether to its power supply line or to its audio circuits or to its rf circuits, senses rf transmissions to the cellular telephone system cell "central office" as its means of activity detection. The activity detector of the invention is designed uniquely to detect cellular telephone activity of cellular telephones in its close proximity, as will be described, and preferably mutes an audio output by non-catastrophic means—i.e., it does not switch off a whole unit, but rather effects electronic attenuation of the audio signal, e.g., by electrical connection to the mute function of the automobile radio receiver, etc. The cellular telephone activity detector of the invention is most conveniently, but not necessarily mounted inside the automobile radio receiver.

SUMMARY OF THE INVENTION

According to the present invention, there is provided a wideband radio receiver, including both an amplitude-detecting capability, and a frequency-discriminating capability, and a transmission duration discriminating capability, and, further, incorporating a "processor" to determine from the amplitude information and from the frequency information, whether a cellular telephone transmission or conversation is in progress in its close proximity. The processor outputs a control signal for interfacing to an accessory device via a controller, in the manner appropriate to the accessory device, and the type of control to be exercised over it. The transmission duration discriminator prevents activation of the controller if the duration of the transmission is less than a certain predetermined minimum threshold transmission duration in order to ignore cellular telephone status-checking and signalling transmissions.

According to further features in the preferred embodiments, the activity-detection range may be adjusted, by receiver-sensitivity attenuation, to avoid signals emanating from cellular telephones in nearby vehicles, or in use by passers-by; or, maximized, for use, for example, for radio controlled door and window locking and closing, when the owner carries his phone outside the car, and uses it to trigger the activity detector.

According to further features in the preferred embodiments of the invention described below, the amplitude-detecting and frequency-discriminating circuitry may be implemented in one circuit block, not necessarily as two separate circuit functions, providing economic benefit.

According to still further features in the described preferred embodiments, the frequency discrimination circuitry may be realized by substantially totally "digital" circuitry means, or by combination of digital and analog techniques, and may provide either the equivalent functionality of a high-pass filter or bandpass filter function, when viewed from a system functionality level.

The output connection is normally a galvanic connection to an audio accessory, which mutes or quiets the audio output, by a dc control voltage which controls the audio level. Hence, the audio level may be either reduced to a low level, or completely shut off, and may be restored without "popping" by smooth change of the control voltage from that corresponding to the reduced-audio level to that corresponding to normal audio level.

According to another embodiment, the output means is a relay, optocoupler, radio link, or similar which provides galvanic isolation.

According to another embodiment, the output accessory device to be controlled, may be lights, horn, windows, door-locks, or similar non-audio load.

The present invention successfully addresses the shortcomings of the presently known configurations, by providing a cellular telephone activity detector, which does not require galvanic connection to the cellular telephone, or to its power supply line, as in prior art. The invention discloses novel activity-detection means, including transmitted-signal amplitude detection, frequency discrimination, processing to analyze these, and turn-on delay and turn-off delay of the control output, to assure smoothness of operation of the complete system.

BRIEF DESCRIPTION OF THE DRAWINGS

The invention is herein described, by way of example only, with reference to the accompanying drawings, wherein:

FIG. 4 is an alternative frequency-discriminator embodiment.

DESCRIPTION OF THE PREFERRED EMBODIMENTS

The present invention is of a cellular telephone activity detector which can be used for control of various accessory devices, in response to activity of the cellular telephone. Specifically, the present invention can be used to mute the audio output of an automobile radio when a cellular telephone is in use in the car.

The principles od operation of a cellular telephone activity detector according to the present invention may be better understood with reference to the drawings and the accompanying description.

Figure 1A:
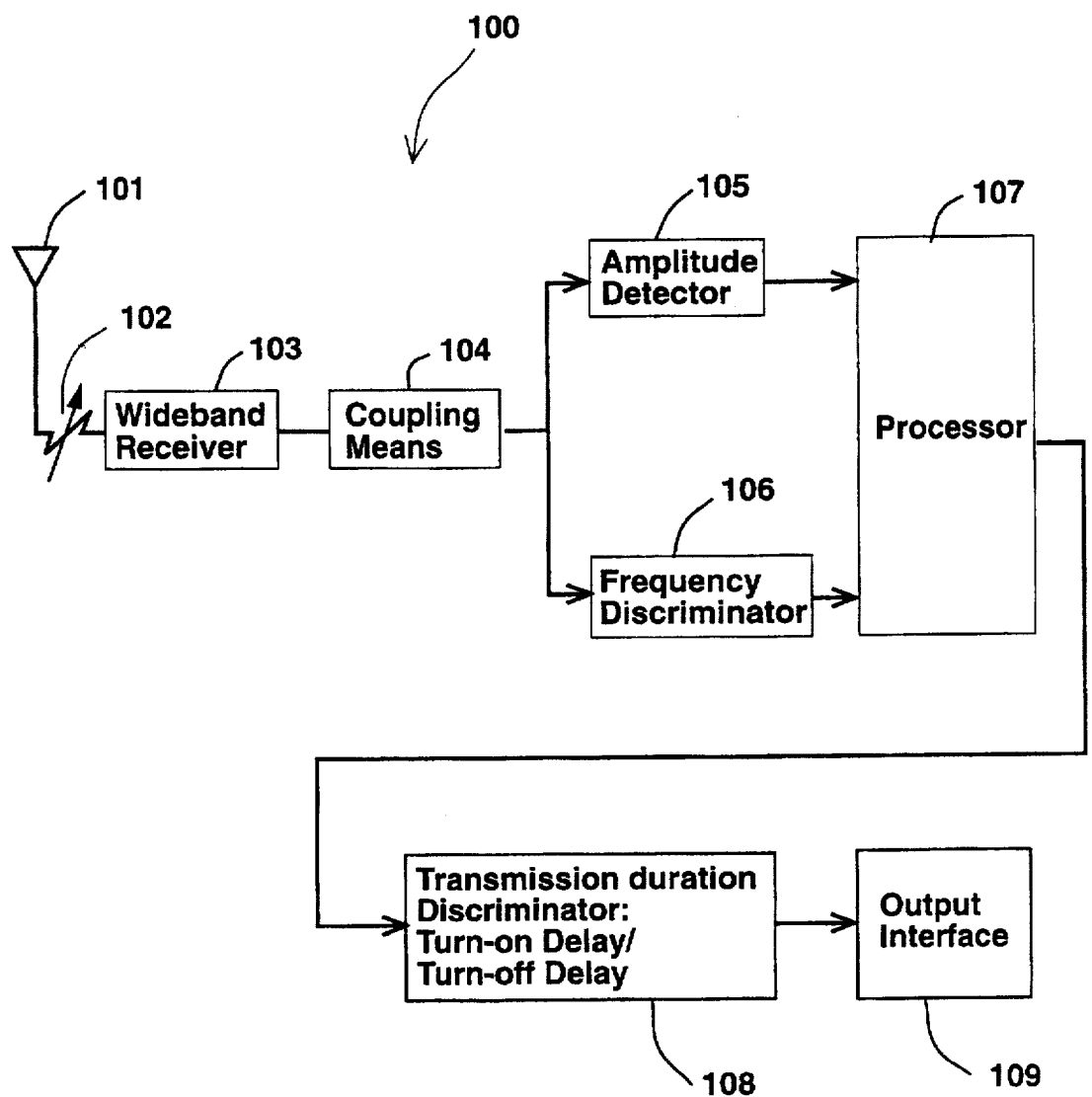
FIG. 1a is a block diagram of an activity detector according to the general concept of the present invention.

Referring now to the drawing, FIG. 1a illustrates a representative block diagram incorporating the concept of the cellular telephone activity detector of the present invention. This block diagram does not represent the only possible implementation of the invention; rather, many implementations are possible and are included within the scope of the invention.

The cellular telephone activity detector is generally referenced 100, and comprises an antenna, 101, for reception of signals from the cellular telephone during its operation, an input attenuator, 102, for sensitivity adjustment, a wideband receiver, 103, a coupling means, 104, an amplitude detector, 105, and a frequency-discriminator, 106, a processor, 107, turn-on and turn-off delays, 108, and an output interface, 109.

The wideband receiver, 103, is employed for its low-cost, and for the resulting simplicity of the system. Use of narrow-band tuned circuits in the receiver front-end would necessitate tuning to monitor the wide 800 MHz to 1.3 GHz cellular telephone spectrum for activity. Such tuning would require frequency-sweeping, and would result in slow response of the activity detector. This receiver, 103, passes energy in the whole cellular telephone spectrum, via coupling means, 104, to the amplitude detector, 105, and to the frequency-discrimination, 106.

Antenna, 101, receives transmitted energy in its proximity, in particular from the cellular phone in use near it. The antenna output is variably, appropriately attenuated by attenuator, 102. This is advantageous as an activity detector range limiter and has the benefit of reduces intermodulation products generation in the receiver from end. The wideband receiver, 103 provides necessary gain, and may include frequency translation, to frequencies more convenient for the signal conditioning. The wideband receiver front end output is coupled to the amplitude detector, 105, and frequency discriminator, 106, by coupling means, 104, which is often a series coupling capacitor, as will be discussed later. The amplitude detector and frequency discriminator functions are shown here as two separate blocks, but their functionality may be realized in one combined block, as will be discussed. The signal processor, 107 receives the results of the amplitude detection and frequency discrimination, and operates to determine whether a cellular telephone is active in its near vicinity.

When activity is detected, an appropriate output is provided to the controlled device by output interface, 109, after a turn-on delay provided by delay block, 108, and when activity ceases the output is removed after a turn-off delay provided by block, 108. Although both delays are shown here in one block, in general, these may be two different delay, implemented by separate circuitry.

Figure 1B:
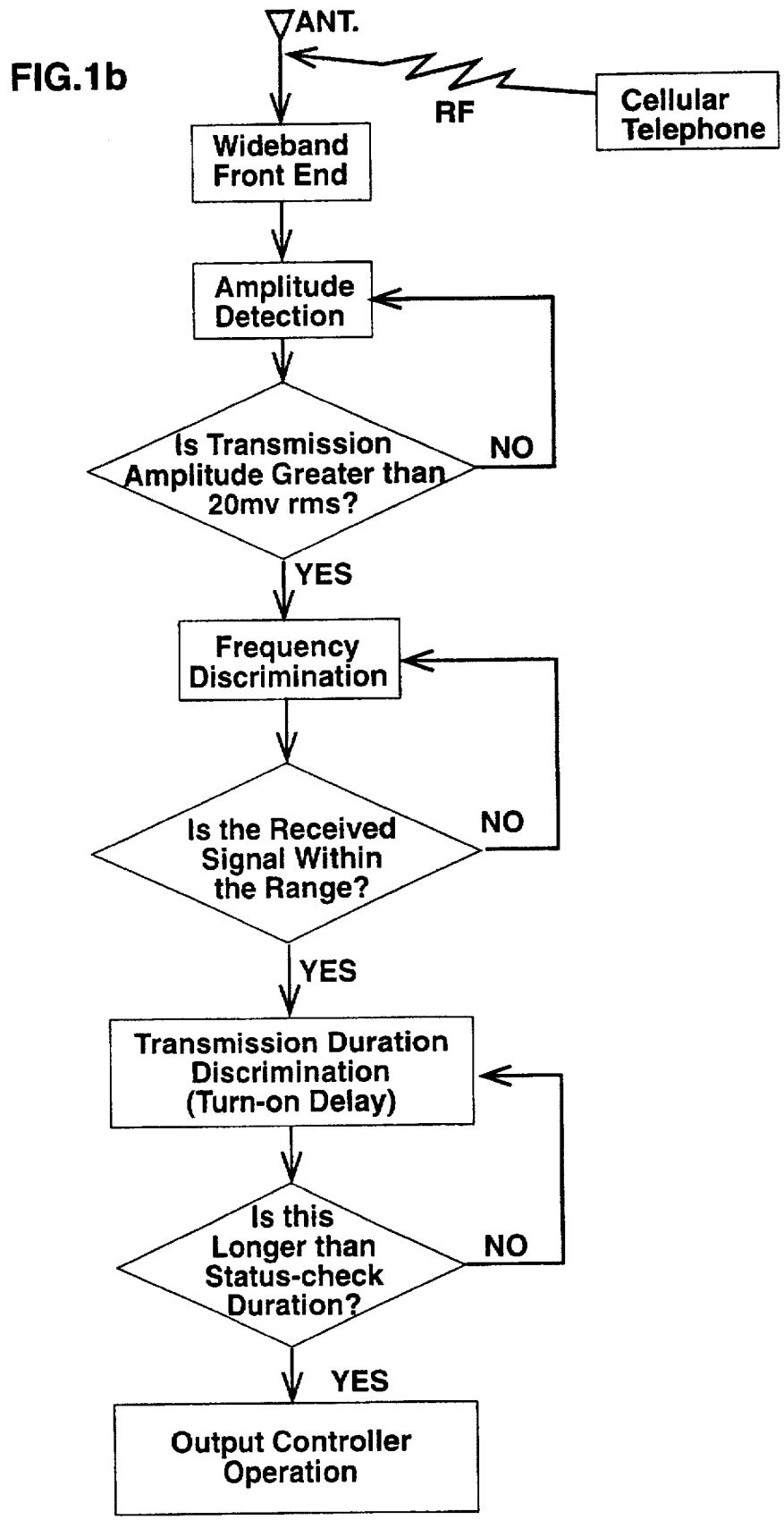
FIG. 1b is a representative flow chart of a representative decision logic employed by the processor unit of the invention.

FIG. 1b provides a representative flow chart of the logic of the operation of an implementation of an activity detector system according to the invention. The activity detector limits its detection to presence of cellular telephone activity by means of the frequency discriminator. This minimally determines that the frequency of the received signal is above about 800 MHz, the low-end of the cellular telephone frequency range of 0.8 to 1.3 GHz. This wide frequency range results in use of a wideband receiver for response time and cost considerations, as above. A bandpass frequency-discriminator may alternatively be employed, but the low-cost solution of a "high-pass" frequency discriminator is adequate to reject most radio transmissions that would normally be encountered as possible false triggering energy sources, since most commercial and amateur radio allocations are below this range.

The amplitude detector has a sufficiently high detection threshold to limit detection to signals in very close proximity, at maximum sensitivity, say, within three meters, for example to quiet a radio receiver when the wife listening to the radio in her kitchen receives or places a call, and with input attenuation, as usually employed to, say, about one meter, for example, in the usual automotive application. The gain required of the wideband receiver front end is determined by the detector threshold setting corresponding to the minimum detected signal level defined as indicating a valid transmission signal strength. The amplitude required in the preferred embodiment is taken as 20 mVrms minimum.

A further feature of the activity detector, the turn-on delay, provides smooth operation, by avoiding triggering in response to status-checking transmissions, or transient, spurious, non-cellular phone transmissions or noise sources.

Figure 2:
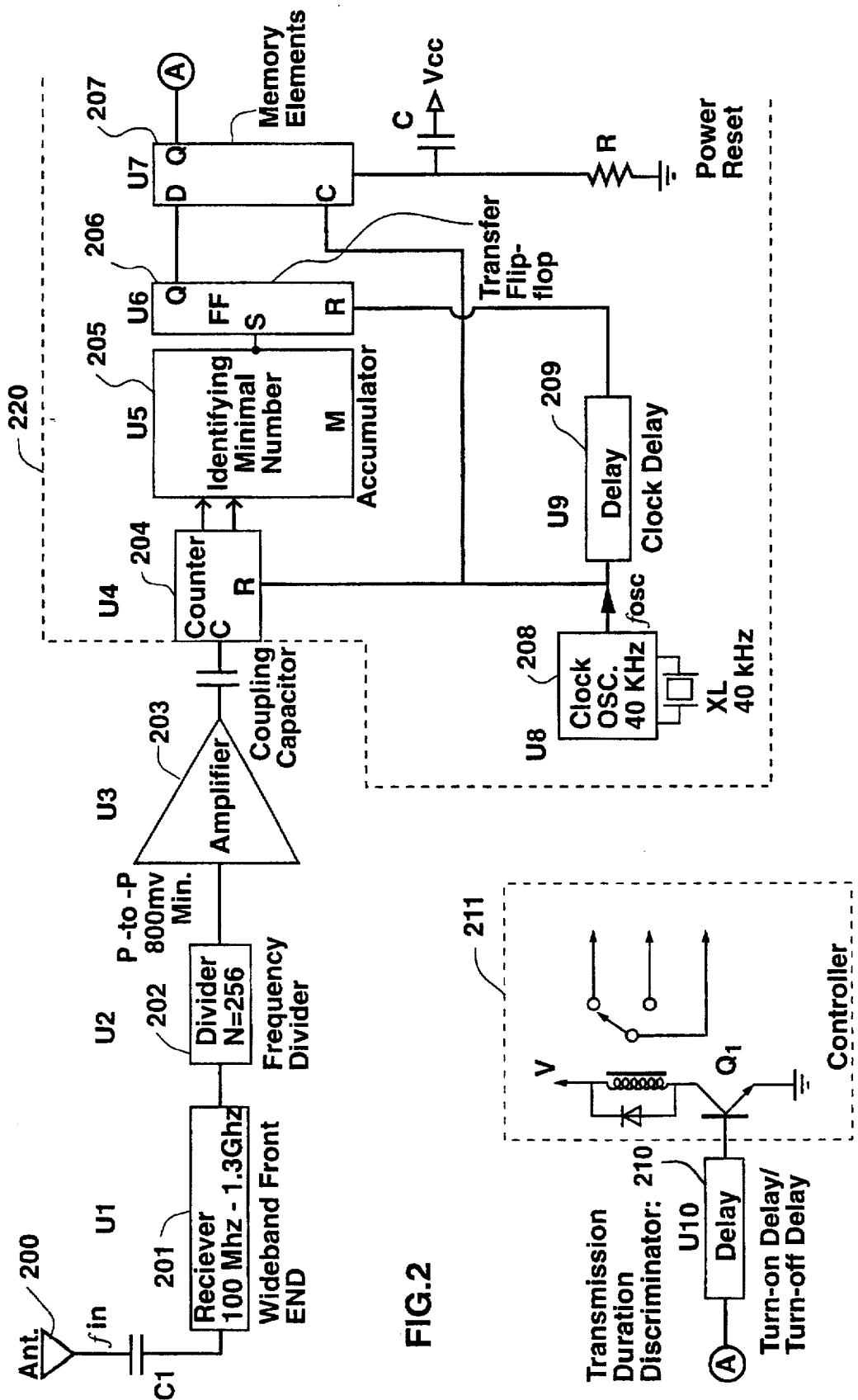
FIG. 2 is a block diagram of a preferred embodiment of the invention.

FIG. 2 is a block diagram of a preferred embodiment of the invention. It features frequency division by 256, to reduce the wideband front-end output signal to a more convenient frequency for the following counter circuitry. An additional amplifier is provided after this frequency changer, followed by a series coupling capacitor. In the preferred embodiment of FIG. 2, the input noise margins of the frequency divider block, 202, provides the threshold detection level corresponding to 20 mVrms at the antenna, 200. The input wideband front-end block, 201, gain, is the input noise margin divided by 20 mVrms (56 mVp-p). The noise margin of the frequency divider, 202, is the voltage difference between its input "high" level and its input "low" level. Amplifier block, 203, provides interfacing and level-shifting to counter, 204, the input of the frequency discriminator portion of the system, generally referenced, 220, which consists of 204 through 209.

If no frequency divider were included in the system, but if the wideband front end output were applied directly to the frequency discriminator, then its input noise margin could be used for amplitude detection, resulting in the combination of amplitude detection and frequency discrimination in one block.

The frequency discriminator of the cellular telephone activity detector embodiment of FIG. 2, is a totally digital design, and is therefore, especially well-suited for implementation in a digital VLSI integrated circuit. This is both cost-effective, and manufacturable, requiring no production adjustments. In FIG. 2, the input frequency is divided by a factor of 256. When the amplitude is sufficient to trigger the input of divider, 202, then a sufficient signal strength has been determined by "empirical" processing to have been received to indicate a valid transmission signal strength. The counter, 204, is reset by a clock oscillator, 208, on a 50 percent duty cycle basis, so it counts incoming pulses of carrier frequency that are received in one half cycle of the oscillator. The counter output pulses are accumulated in accumulation block, 205, which determines when a minimum number of counter output pulses have been input to it. When this number, M, of pulses has been received, the accumulator, 205, provides a pulse to the set input of the following transfer flip-flop, 206. At the end of the half-clock period of counting, the counter, 204, will be reset, resetting accumulator, 205. The clock edge will also transfer into the D-flip-flop memory element, 207, the status of the Q output of flip-flop, 206. In order that the data at the D input of memory element, 207, be stable during its clocking time, a delay is provided by delay block, 209, before resetting transfer flip-flop, 206. The frequency discriminator is followed by a transmission duration discriminator turn-on and a turn-off delay block, 210, and by an output controller, 211, which may be of any appropriate design; a representative design being shown. The turn-on delay provides immunity to spurious transmission which would give false indication of cellular phone activity; the turn-off delay similarly gives immunity to false indication of cessation of cellular phone activity.

Figure 3:
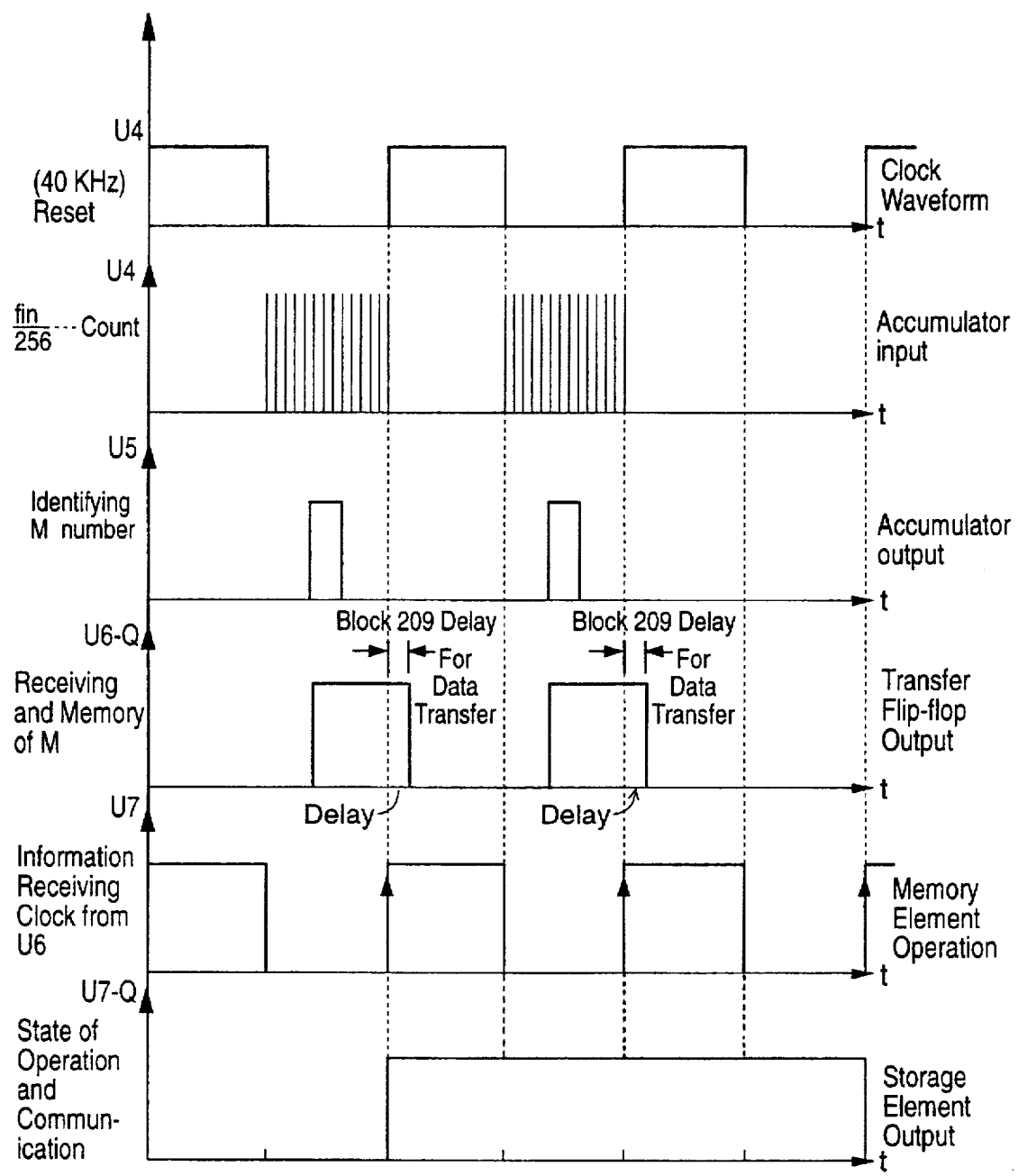
FIG. 3 is a sketch of signals in the block diagram of FIG. 2.

The frequency discriminator operation can be more easily understood by examination of the timing information in FIG. 3. Oscillator, 208, output provides the reset signals, and determines the duration of the counting interval. In out example, the input frequency is divided by 256. So pulses of fin/256 are being counted in 204 accumulated in 205. When M pulses are accumulated, an output is transferred to 207, on the following clock reset edge. 207 then drives the appropriate output driver for the given application. The minimum input frequency can be easily calculated. It is just 256 time M times twice the clock frequency (since we only count during one-half of the clock period).

Re-arranging and writing this in symbols, we solve for M as a function of fin:

$$M = \frac{fin}{(2f\text{clock})(N\text{ divider})}$$

$$M = \frac{800 \text{ KHZ}}{2 \times 40 \text{ KHz} \times 256} = 39$$

In our example:
So accumulator 205, is set to give an output when it accumulates 39 pulses from U4 within one-half of the period of the clock, 208. This provides the desired equivalent, inexpensive, "high-pass" equivalent frequency discriminator function.

While a minimal-cost preferred embodiment, employing a high-pass frequency discriminator has been described above, a bandpass frequency discriminator may alternatively be employed, probably at greater cost. The principle of such a circuit is illustrated in FIG. 4, and will be briefly described. The bandpass frequency discriminator, 300, consists of a monostable multivibrator, 301, which generates a fixed-width output pulse each time it is triggered. The output pulse-width must be less than the minimum time between input pulses. The output pulse train is low-pass filtered, say, by an RC network, low-pass filter in block, 302, to provide a DC level to window-comparator block, 303. This includes no voltage comparators with reference voltages corresponding to minimum and maximum input pass-band frequencies. The two comparators with references are labelled as 303a and 303b. Details of their construction is not shown. Their outputs are combined and drive the output interface block when the input frequency is in range.

While the invention has been described with respect to a limited number of embodiments, it will be appreciated that many variations, modifications, and other applications of the invention may be made.

For example, various amplitude detector and frequency discriminator implementations are possible. The wideband receiver front end has not been described in detail, but could be any of a number of configurations. Input attenuator, output interface, and counters may all be any of a variety of designs.

In order to fully appreciate the invention, it is necessary to mention the feature of the operation of cellular telephones which the invention depends on. Just as in a wired telephone system, in which the individual telephones are connected by twisted pair to the central office, there is an indication to the central office of a continued off-hook condition, due to continued DC current flow in the user loop, so also, in the cellular telephone system an indication of continued off-hook condition of the individual cellular phone is provided to the central office. This is done by either continuous carrier transmission to the central office or by transmission of periodic bursts at carrier frequency to the central office, to indicate the continued off-hook condition. It is these transmissions to the central office which the cellular telephone activity detector of the present invention depends on.

The present invention measures directly, activity of the cellular phones in its proximity by monitoring the transmission medium, the communications channel, for activity. It does not indirectly measure activity by testing for an artifact of the activity, as in prior-art systems, which monitor increased supply drain of the cellular phone during periods of activity; thereby requiring direct connection to each of the phones to be monitored, and with the associated problem of lack of knowledge of the proper supply-drain threshold to use.

The present invention not only overcomes these problems, but monitors activity of all cellular phones in its proximity without direct connection to any of them.

This invention is a true cellular telephone activity detector, not an artifact detector as in the prior art supply-drain detection techniques.

While the invention has been described with respect to a limited number of embodiments, it will be appreciated that many variations, modifications and other applications of the invention may be made. For example, coupling means 105 may include a frequency translator.

What is claimed is:

1. A device for controlling an accessory based on the detection of carrier frequency transmissions of appropriate input frequency exceeding a minimum threshold amplitude from a nearby cellular telephone, comprising:

(a) an independent receiver for directly detecting the transmissions from the nearby cellular telephone, said receiver including a wideband front end; and, (b) a controller connected to said receiver for controlling the accessory device based on said detection of the transmission from the nearby cellular phone, wherein said frequency discriminator serves to determine whether the input frequency is greater than a certain pre-determined threshold frequency and amplitude; said frequency discriminator comprises a clock oscillator, a counter for counting incoming pulses from the received carrier frequency, an accumulator for determining whether the number of counter pulses exceeds a minimum number, M, a transfer flip-flop connected to the output of the accumulator, a memory element for storing the accumulator output and a clock delay element connected between the clock oscillator and transfer flip-flop for transferring the accumulator output to the memory element.

2. The device of claim 1, wherein said receiver includes an amplitude detector for determining the presence of the transmissions with amplitudes above a pre-determined threshold amplitude.

3. The device of claim 1, wherein said receiver includes a frequency divider connected to said wideband front end for dividing input frequency of the transmissions, said frequency divider having an input noise margin.

4. The device of claim 3, wherein said wideband front end and said frequency divider together perform amplitude detection and wherein the amplitude detection threshold is established by said frequency divider input noise margin.

5. The device of claim 1, wherein said receiver includes a frequency translator following said wideband front end.

6. The device of claim 1, wherein said frequency discriminator serves to determine whether the input frequency is greater than a first pre-determined frequency and less than a second pre-determined frequency.

7. The device of claim 6, further comprising a monostable multivibrator, a low-pass filter, and a window comparator.

8. The device of claim 1, wherein the accessory device includes an audio system.

9. The device of claim 8, wherein said controller serves to mute said audio system.

10. The device of claim 8, wherein said controller serves to lower the sound level of said audio system.

11. The device of claim 1, wherein said controller serves to cut off power to the accessory device.

12. The device of claim 1, wherein said controller serves to apply power to the accessory device.

13. The device of claim 1, wherein said controller serves to periodically cut off power to the accessory device, or to periodically apply power to the accessory device.

14. The device of claim 1, further comprising a transmission duration discriminator.

15. The device of claim 14, wherein said transmission duration discriminator includes a turn-on delay which serves to determine whether the transmission duration is greater than a certain pre-determined minimum threshold transmission duration.

16. The device of claim 1, further comprising a turn-off delay.

17. The device of claim 4, further comprising a processor for operating said controller in response to said amplitude detection and said frequency detection.

18. The device of claim 1, further comprising an input attenuator.

19. The device of claim 1, wherein said receiver includes a frequency discriminator connected to said wideband front end for dividing input frequency of the transmissions, said frequency discriminator having an input noise margin.

20. The device of claim 19, wherein said wideband front end and said frequency discriminator together perform amplitude detection and wherein the amplitude detection threshold is established by said frequency discriminator input noise margin.

* * * * *